Sept. 21, 1943.  W. F. BERNSTEIN ET AL  2,330,106
GASKET MATERIAL
Filed March 14, 1941
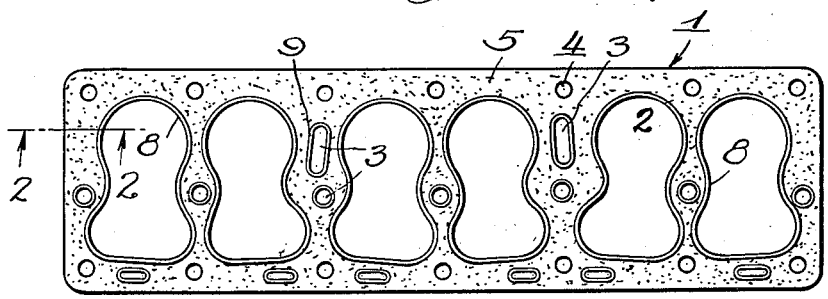
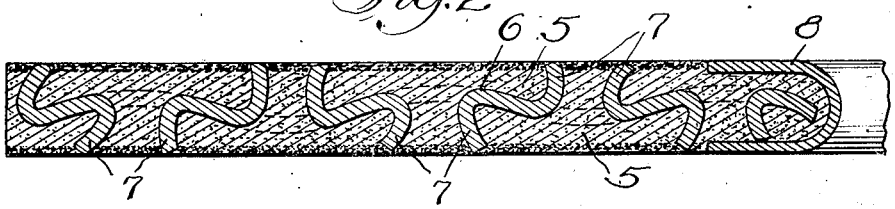
INVENTORS.
Wilburn F. Bernstein
and Thomas F. Mika
Parkinson & Lane Attys.
Witness.
Chas. R. Koursh.

Patented Sept. 21, 1943

2,330,106

UNITED STATES PATENT OFFICE 2,330,106

GASKET MATERIAL

Wilburn F. Bernstein, Brookfield, and Thomas F. Mika, Chicago, Ill., assignors to Victor Manufacturing & Gasket Company, Chicago, Ill., a corporation of Illinois Application March 14, 1941, Serial No. 383,396

6 Claims. (Cl. 288—29)

The present invention relates to a gasket construction and more particularly to a novel gasket material and in the novel means and method of manufacture of this material. In its preferred form, the novel gasket material is combined or assembled with a reinforcing core or metal backing to form a gasket of the type adapted for use with a cylinder head, manifold and various other parts of an internal combustion engine or automobile, or wherever relatively high pressures, temperatures and/or severe working conditions may be encountered. In the manufacture of this novel gasket material the asbestos millboard is first produced upon a paper making machine in which the fiber and binder are uniformly distributed throughout the entire sheet to thereby insure the production of a continuously uniform product. After the asbestos millboard is produced it is then combined with a reinforcing core or backing which may be of perforated or expanded metal or other material suitable for the purpose.

The invention further comprehends a novel gasket construction in which the gasket material is formed of an asbestos base treated and bonded with a resilient binder having flow characteristics so that when the alternate sheets of gasket material and reinforcing core or backing are combined as by passing the laminated structure between one or more pairs of rollers, the semiplastic gasket material flows into and uniformly anchors within all of the depressions and interstices of the core or backing so as to form an integral unit. In flanging or inserting grommets in the gasket about the combustion openings and/or water holes, the plasticity or flow characteristics of the material causes it to flow into and fill the spaces within these flanges or grommets when the gasket is rolled or flattened. By thus completely filling these grommets or flanges with the bonded asbestos, there is no danger of collapse of the grommets or flanges when in use and when subjected to the hot gases in the combustion chambers, one cause of gasket breakdown.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawing, and while there is shown therein a preferred embodiment, it is to be understood that the same is susceptible of modification and change, and comprehends other details, arrangements of parts, features and constructions without departing from the spirit of the invention.

In the drawing:

Figure 1 is a plan view of a cylinder head gasket constructed in accordance with the present invention.

Figure 2 is an enlarged view in vertical cross section taken in a plane represented by the line 2—2 of Figure 1.

The novel invention is shown as embodied in a cylinder head gasket 1 of any desired design and provided with the usual combustion openings 2, water holes 3 and bolt holes 4. In the disclosed embodiment, the gasket is formed of alternate layers or laminae of compressible prebonded gasket material 5, 5 and a reinforcing core 6 of expanded or perforated metal or other backing or reinforcing material suitable for the purpose.

As clearly shown in Figure 2, the opposite faces of the core 6 are covered with a layer or lamina 5 of pre-formed gasket material such as asbestos fibers bonded by a binder of such nature as to give the fibrous material flow characteristics and render the sheet formed therefrom resilient and compressible so that it will yield to pressure but return to its approximate original shape and dimensions. Due to the flow characteristics of the gasket material, when a sheet formed therefrom is combined with a core or backing, this material flows into all of the voids or interstices and in and around the anchoring projections 7 on the core, and completely fills the space within the grommets or flanges 8 provided about the combustion openings 2, as well as the grommets or flanges 9 provided about the water holes 3. Although Figure 2 shows a layer of prebonded asbestos millboard affixed to the opposite sides of the metal core, it will be appreciated that the metal core may have projections on but one side and in that event but a single layer or lamina of gasket material or asbestos millboard will be employed and affixed to the pronged side of the core or backing.

In the manufacture of the gasket, the asbestos millboard is first produced upon a paper making machine. Excellent results have been secured in the preparation of the millboard by adding approximately 150 pounds of virgin fiber, 150 pounds of asbestos scrap fiber containing set cement, and 25 pounds of cement. This asbestos fiber and cement is added to water in a beater of the conventional paper making type. Although we have given specific proportions of virgin and scrap fiber, these proportions may be varied between any desired limits of all virgin to all scrap.

To the asbestos fiber and water in the beater is added an emulsion of hydrocarbon oil such as Jr. Red engine oil and bentonite, with which is mixed a dispersion of carbon black and other desired coloring material. This is added to the beater in the operation, thus getting a thin deposit of oil and pigment around each fiber of the asbestos base.

The asbestos millboard after sheeting is combined with a perforated steel or metal core or reinforcement 6. In order to overcome water impingement and to get greater scuff resistance to the edges of the gasket, the invention comprehends blanking the sheets previously formed into gaskets and then dipping the blanked gasket in an oil-resin-graphite coating. This coating has great inherent non-stick characteristics at relatively great loads and elevated temperatures. The film formed thereby when used gives maximum water, oil and gasoline resistance and is incompatible with treatment previously accorded the asbestos millboard.

The gaskets after being coated with the oil-resin-graphite coating are then flanged in the usual manner, closed and flattened. The object of incorporation of the oil is to provide a means for slippage between the fibers and thus greatly enhance the flow characteristics of the material. When flanged, the body of the flange will fill with the treated asbestos and will prevent feather-edging of the flanges.

In making the emulsion of hydrocarbon oil, we have secured good results using the following ingredients in substantially the following proportions:

| | |
|---|---|
| Jr. Red oil _____ gallons__ | 5¼ |
| Bentonite _____ pounds__ | 6 |
| Water _____ gallons__ | 25 |

In making this emulsion, the bentonite is added to the water first. It swells and forms a colloidal suspension in the water to which is then added the oil with rapid agitation. The colloidal particles of the bentonite in the solution disperse and suspend the oil forming an emulsion.

The dispersion of carbon black and other coloring material may be formed of the following ingredients and in approximately the following proportions:

| | |
|---|---|
| Fumonex or soft carbon black ____ pounds__ | 12½ |
| Mexican graphite or a natural amorphous carbon _____ pounds__ | 2½ |
| Sodium salt of polymerized poly-aryl sulfonic acids _____ pounds__ | 1½ |
| Bentonite _____ do____ | 5½ |
| Water _____ gallons__ | 25 |

In making this solution, the sodium salt of polymerized poly-aryl sulphonic acids, bentonite, carbon black and graphite are added to the water. The sodium salt of polymerized poly-aryl sulphonic acids acts as a dispersing agent, the bentonite or clay acts as a supporting colloid, and the soft carbon black acts to absorb any oil not deposited on the fibers as well as forming a pigment. By increasing the carbon black content, it is possible to absorb an increased quantity of oil which is retained in the finished product. The graphite acts as a lubricant.

As to the oil-resin-graphite coating which we have found highly successful for coating the blanked gaskets, good results have been secured in the use of the following ingredients in approximately the following proportions (parts given are by weights):

| | |
|---|---|
| China-wood oil _____ | 30 |
| Phenol-formaldehyde resin (Bakelite) _____ | 30 |
| Dipentene _____ | 20 |
| Toluol _____ | 19 |
| Cobalt and lead naphthenates_____ | 1 |
| Graphite _____ | 10 |

The varnish coating is preferably prepared by cooking the resin into the oil at a temperature of approximately 500° F. and then thinning with the solvents such as dipentene and toluol in which the driers such as cobalt and lead naphthenates have been dissolved.

Although we have set forth above certain specified ingredients and proportions, good results may be secured by the substitution of other ingredients and preparations. For example, in place of the bentonite, good results may be secured by the use of methyl cellulose, agar-agar gum, gum algae, gum karaya, gum arabic, gelatin, dextrin, casein, etc. We have also found that any lubricating or process mineral oil, or modified mineral oil, having a viscosity of substantially 10 to 160 S. A. E., may be substituted for the Jr. Red engine oil. Good results have also been secured by the use of a vegetable or animal oil, including non-drying oils such as castor oil, semi-drying oils such as soya or corn, or drying oils such as China-wood, perilla, dehydrated castor or linseed oil.

For the carbon black, we may use pigments, such as iron oxide, barytes, lithopone, asbestine, chalk, charcoal or other adsorptive pigments. In place of graphite, good results have been secured by the use of mica, soap-stone, talc or other lubricating pigments. For the polymerized organic salts of alkyl aryl sulfonic acids, we may use dibutyl phenyl phenol sodium disulfonate, diamyl ester of sodium sulfosuccinic acid, fatty acid soaps of morpholine, monoethanolamine, tetraethylene pentamine and the like.

In place of the specified varnish coating of resin and oil, we have had good results using a long oil modified alkyd. Furthermore, any suitable solvent such as benzol may be used in place of the dipentene and/or toluol, and any resinate type driers such as cobalt, lead, magnesium, etc., may be used for the naphthanates.

We claim:

1. A sheet of compressible gasket material of uniform composition and density throughout, comprising asbestos fiber and a binder giving the fiber flow-characteristics and including petroleum oil, carbon black and bentonite dispersed throughout the mass of fiber with the oil and carbon black providing a thin coating around the individual fiber, and a coating for the sheet composed of a varnish comprising a phenol-aldehyde-China-wood-oil-resin and graphite.

2. A sheet of compressible gasket material composed of asbestos fiber, a binder dispersed throughout the mass of fiber and including petroleum oil and carbon black deposited on the individual fiber throughout the mass, and a coating for the exposed surfaces of the sheet composed of a varnish comprising a phenol-aldehyde China-wood oil resin.

3. A sheet of gasket material comprising asbestos fiber and a binder including non-drying petroleum oil and carbon black dispersed throughout the mass of fiber in the gasket material, and a coating of a varnish comprising a phenol-aldehyde China-wood oil resin providing maximum resistance to attack by water, oil and gasoline.

4. A gasket comprising alternate layers of asbestos millboard and expanded metal, the asbestos millboard including asbestos fiber and a binder of petroleum oil, carbon black and graphite dispersed throughout the millboard to provide a coating thereof about the individual fiber, and a surface coating of a varnish comprising a phenol-aldehyde China-wood oil resin and graphite.

5. A gasket comprising alternate laminae of asbestos millboard having flow characteristics and a perforated metal reinforcement, the asbestos millboard being composed of asbestos fiber in which the individual fiber are provided with a coating of petroleum oil and carbon black to provide a millboard of uniform composition throughout, and a surface coating for the exposed portions of the gasket composed of a varnish comprising a phenol-aldehyde China-wood oil resin and graphite.

6. A gasket comprising alternate laminae of asbestos millboard having flow characteristics and a metal reinforcement, the asbestos millboard composed of asbestos fiber and a coating of petroleum oil and a pigment dispersed throughout the entire mass of fiber so as to coat the individual fiber and give them flow characteristics and resiliency, and a non-stick coating on the exposed surfaces of the gasket including a varnish comprising a phenol-aldehyde China-wood oil resin.

WILBURN F. BERNSTEIN.
THOMAS F. MIKA.